United States Patent [19]

Rieck

[11] Patent Number: 4,820,439
[45] Date of Patent: Apr. 11, 1989

[54] WASHING AND CLEANING AGENT CONTAINING SURFACTANTS, BUILDER, AND CRYSTALLINE LAYERED SODIUM SILICATE

[75] Inventor: Hans-Peter Rieck, Hofheim am Taunus, Fed. Rep. of Germany

[73] Assignee: Hoechst Aktiengesellschaft, Frankfurt, Fed. Rep. of Germany

[21] Appl. No.: 20,079

[22] Filed: Feb. 27, 1987

Related U.S. Application Data

[63] Continuation of Ser. No. 721,287, Apr. 9, 1985, Pat. No. 4,664,839.

[30] Foreign Application Priority Data

Apr. 11, 1984 [DE] Fed. Rep. of Germany ....... 3413571

[51] Int. Cl.$^4$ ............................ C11D 3/08; C11D 3/12
[52] U.S. Cl. ................................ 252/135; 252/174.25; 252/174.19; 252/526; 252/527; 252/174.16
[58] Field of Search .................. 252/135, 174.25, 175, 252/179, DIG. 11; 423/332

[56] References Cited

U.S. PATENT DOCUMENTS 3,840,348 10/1974 Vessey ................................ 423/332
3,918,921 11/1975 Pierce ................................. 423/332

FOREIGN PATENT DOCUMENTS 75392 2/1953 Denmark .
101099 2/1984 European Pat. Off. .
908803 10/1962 United Kingdom .
1149859 4/1969 United Kingdom .

Primary Examiner—Prince E. Willis
Attorney, Agent, or Firm—Connolly & Hutz

[57] ABSTRACT

Crystalline layered sodium silicates having the composition $NaMSi_xO_{2x+1} \cdot y\ H_2O$, in which M denotes sodium or hydrogen, x is a number from 1.9 to 4 and y is a number from 0 to 20, are used for softening water containing calcium and/or magnesium ions.

5 Claims, No Drawings

WASHING AND CLEANING AGENT CONTAINING SURFACTANTS, BUILDER, AND CRYSTALLINE LAYERED SODIUM SILICATE

This application is a continuation of my copending application Ser. No. 721,287, filed Apr. 9, 1985, now U.S. Pat. No. 4,664,839.

The present invention relates to the use of crystalline layered sodium silicates for softening water and a process for softening water containing Ca and/or Mg ions.

Naturally occurring water, whether surface water or ground water, and conventional tap water contains, in addition to dissolved gases, a number of salts which are dissolved out of the soil and rock or, in some cases, also originate from effluent feeds. The most important constituents are the salts of sodium, calcium and magnesium. Of these, only the alkaline earth metals calcium and magnesium are responsible for hardness in the water. The mg of alkaline earth metal oxide per liter of water is usually stated. 10.00 mg of CaO or 7.19 mg of MgO/l correspond here to the measurement unit of one German degree (°d). The total hardness of the water (in the Federal Republic of Germany) in general consists of 70–85% of Ca hardness and 30–15% of Mg hardness.

This hardness presents problems in washing and cleaning processes since the alkaline earth metal ions impair the washing effectiveness of the surfactants. For this reason, so-called builders are added to the washing and cleaning agents, these completely or partly eliminating the hardness of the washing solution, thus preventing interaction between the alkaline earth metal ions and the surfactants and increasing the washing effectiveness of the surfactants. This softening can be achieved by converting the alkaline earth metal ions into soluble complex salts. Precipitation is less desirable if there is a danger of the insoluble alkaline earth metal salts being deposited on the fabric or on components of the washing machine. In another method, the sodium ions of an ion exchanger are replaced by the alkaline earth metal ions from the washing solution.

Pentasodium triphosphate, $Na_5P_3O_{10}$, is a widely used, very effective builder in washing agent formulations. However, phosphates are held responsible for eutrophication of rivers and lakes, i.e. for an increase in algal growth and oxygen consumption. Legal measures have therefore been taken in many countries to limit the content of phosphates in washing agents.

Trisodiumnitrilotriacetate, $3\ Na^+N(CH_2CO_2^-)_3$, is another complexing agent. There are also ecological objections to this substance, since it is not yet precisely known to what extent the nitrilotriacetate can dissolve heavy metals out of rocks in the rivers and lakes.

Zeolite A has recently been used as a substitute for these complexing builders. The zeolite is capable of reducing the $Ca^{2+}$ content by ion exchange, but its Mg-binding capacity is low.

Sodium silicates have already been employed for a long time in washing agents. Their chief function is to be seen as supplying $Na^+$ ions and increasing the pH value. Only amorphous sodium silicates having a molar composition of $Na_2O:SiO_2$ of about 1:2 to 1:3.3 are used in the commercially available washing agents. In the patent literature relating to the use of sodium silicates in washing agents, there is no reference to the use of crystalline compounds of corresponding composition.

Although crystalline sodium silicates with an $Na_2O:SiO_2$ ratio of about 1:2 to 1:4 have been known in principle for a long time, they are considerably more expensive to prepare by the known processes than their amorphous analogs. Only amorphous silicates which—in the form of glasses—are anhydrous or are available as water-containing solids are therefore in general use. Finally, aqueous silicate solutions are also used.

There was the object to provide sodium silicates with a particularly high effectiveness for use as water softeners.

The invention relates to the use of crystalline layered sodium silicates having the composition $NaMSi_xO_{2x+1}\cdot y\,H_2O$, in which M denotes sodium or hydrogen, x is 1.9 to 4 and y is 0 to 20, for softening water containing calcium and/or magnesium ions.

The crystalline sodium silicates used according to the invention prove to be layered in scanning electron microscope photographs.

From the known compounds of the formula $Na_2Si_xO_{2x+1}\cdot y H_2O$, the corresponding compounds $NaHSi_xO_{2x+1}\cdot y H_2O$ can be prepared by treatment with acids and, in some cases, also with water. The water content given by the number y makes no differentiation between water of crystallization and adhering water. M preferably represents sodium. Preferred values of x are 2, 3 or 4. Compounds having the composition $NaMSi_2O_5\cdot y H_2O$ are particularly preferred. Since the sodium silicates employed according to the invention are crystalline compounds, they can easily be characterized by their X-ray diffraction diagrams.

In the range given for x, many crystalline layered sodium silicates which can be employed according to the invention are known.

In the Joint Committee on Powder Diffraction Standards, X-ray diffraction diagrams of corresponding sodium silicates are shown under the following numbers: 18-1241, 22-1397, 22-1397 A, 19-1233, 19-1234, 19-1237, 23-529, 24-1123, 24-1123 A, 29-1261, 18-1242, 22-1395, 19-1235, 22-1396, 19-1236, 18-1240, 19-1232, 18-1239, 12-102, 23-703, 25-1309, 27-708 and 27-709.

Tables 1 to 7 give the characteristic X-ray diffraction reflections of crystalline layered sodium silicates which can successfully be employed according to the invention.

In comparison with the conventional amorphous sodium silicates, some crystalline layered sodium silicates exhibit a clearly increased lime-binding capacity. This applies, for example, to the silicates of Tables 1 and 3, and in particular to the sodium silicate of Table 2. The crystalline layered sodium silicates can replace the amorphous waterglasses or waterglass solutions in washing and cleaning agents. However, they can also be used to supplement these.

Depending on their sodium content, the crystalline layered sodium silicates in some cases have only a limited water-solubility or are even sparingly soluble.

The increased water-softening properties in comparison with amorphous silicates of the same composition are probably to be attributed to the crystalline, layered build-up and to the increased degree of polymerization of the silicate skeleton.

The unexpected influence of the crystal structure on the lime-binding capacity manifests itself in the fact that, for the same analytical composition, clearly different values are obtained depending on the crystalline build-up (identifiable by the X-ray diffraction diagram).

Tables 1 to 7 show the characteristic X-ray diffraction reflections (d values in $10^{-8}$ cm) of crystalline layered sodium silicates which can be employed according to the invention. The silicate according to Table 2 is particularly preferred.

The relative intensities are given in Tables 1 to 7 as vi (very intense=75 to 100), i (intense=50 to 75), m (moderate=25 to 50) and w (weak=0 to 25).

Another characteristic property of the sodium silicates employed according to the invention is that they can be converted into the corresponding free silicic acids with mineral acids. They partly lose their crystallinity here.

The ion exchange capacity of the sodium silicate can be determined by potentiometric titration with a mineral acid in aqueous solution, preferably using moist samples. The values found can be converted to the dried product by parallel determination of the loss on drying.

Sodium silicates which, by this determination method, give ion exchange values of 400 to 1,200 mmol of $Na^+$/100 g of dry silicate are preferably employed for softening water. Those silicates which approximately correspond to the formula $NaHSi_2O_5$ in the anhydrous state and have an exchange capacity of about 500 to 600 mmol of $Na^+$/100 g of product are particularly preferred. These products essentially consist of $NaHSi_2O_5$. Those products which have the approximate formula of $Na_2Si_2O_5$ and an exchange capacity of about 1,000 to 1,100 mmol of $Na^+$/100 g are furthermore preferred. These products essentially consist of $Na_2Si_2O_5$.

Crystalline layered sodium silicates of natural origin and also synthetic products can be employed.

The preparation of the crystalline silicates can be effected from amorphous vitreous sodium silicates, and is described, for example, in Phys. Chem. Glasses, 7, 127-138 (1966) and Z. Kristallogr., 129, 396-404 (1969). Other synthesis routes are also possible.

Na-SKS-6, which resembles $\delta$-$Na_2Si_2O_5$ and Na-SKS-7, which resembles $\beta$-$Na_2Si_2O_5$ are particularly suitable for softening water. Naturally occurring crystalline silicates of the formula $Na_2Si_2O_5$, such as natrosilite, and hydrated silicates, such as canemite, $NaHSi_2O_5 \cdot y H_2O$, can furthermore also be employed. The water of crystallization content and the adhering water are of no significance for the softening effect. Sodium silicates in which y represents a number from 0 to 2, in particular O, are therefore preferred.

The crystalline layered silicates can be employed in the pure form or as a mixture of various silicates. It is advantageous that they can also be used in the presence of any other desired water softeners, for example together with pentasodium triphosphate, trisodiumnitrilotrisulfonate and/or zeolite A; phosphonates, polycarboxylates or other amorphous or crystalline silicates as well as mixtures of the water softeners mentioned or other water softeners can also be used together with the crystalline sodium silicates.

The crystalline layered sodium silicates can also be prepared by ion exchange from corresponding crystalline free silicic acids or other corresponding alkali metal silicates, in particular potassium silicates and lithium silicates, with a layer structure. This ion exchange can also be effected during softening of the water, if sodium ions are present in excess. This is the case, for example, in the use of most textile washing agents.

The crystal size of the sodium silicates employed according to the invention can vary within wide limits. These silicates can be about 0.01 $\mu$m to about 1,000 $\mu$m, preferably 0.1-10 $\mu$m, in size. It is an advantage of the crystalline layered sodium silicates that they have a good action particularly in the alkaline range of the washing liquor at a pH of about 9-12 and in the presence of $Na^+$ ions. This also applies to washing liquors which have a significantly smaller content than about 350 mg of CaO/l or about 144 mg of MgO/l. The presence of relatively large $Na^+$ concentrations, which are usual in washing agents, also only insignificantly reduces the water-softening effectiveness of the sodium silicates according to the invention.

The crystalline layered sodium silicates can therefore advantageously be employed as builders in washing and cleaning agents (in particular dish-washing agents). The presence of surfactants does not impair the action of the sodium silicates.

The invention furthermore relates to a process for softening water containing calcium and/or magnesium ions as well as sodium ions and having a pH of about 8 to 12. This process comprises adding to the water a crystalline layered sodium silicate having the composition $NaMSi_xO_{2x+1} \cdot yH_2O$, in which, in the formula given, M denotes either sodium or hydrogen, x is a number from 1.9 to 4 and y is a number from 0 to 20. The reaction mixture is preferably kept in motion during this softening process.

The effectiveness of the water softeners employed according to the invention and of the process for softening water can be investigated by a procedure in which a calcium or magnesium chloride solution is brought to a pH of 10 with dilute sodium hydroxide solution and the softener is added. The resulting suspension is in general stirred at room temperature (about 22°-26° C.) for 15 minutes and the solid present in the suspension is then filtered off. The residual hardness of the filtrate is subsequently determined and the reduction in the $Ca^{2+}$ or $Mg^{2+}$ concentration, based on the amount of water softener according to the invention weighed out, is calculated from the difference from the starting hardness. Any existing water content of the water softener which can be determined by drying at 400° C. is also taken into account in the amounts weighed out. The Ca- or Mg-binding capacity is thus obtained, and is given in mg of CaO or mg of MgO per g of crystalline layered sodium silicate (anhydrous). The following equation shows how the Ca-binding capacity is calculated.

$$\text{Ca-binding capacity} = \frac{\text{mg of CaO (starting solution)} - \text{mg of CaO (residual hardness)}}{\text{amount of crystalline layered sodium silicate (anhydrous) weighed out}}$$

Only the proportion of water softening caused by ion exchange and, if appropriate, by precipitation is taken into account in this determination method. The complexing action of the dissolved crystalline layered sodium silicate, which can become particularly significant at a lower PH, is not taken into account. The actual water-softening action is therefore greater than that found by this determination method.

The extent of the Ca- and Mg-binding capacity depends on the concentration of alkaline earth metal in the starting solution, the amount weighed out or, associated therewith, the desired residual hardness, the temperature, the pH, the particle size of the silicate, the application form (dissolved, as the hydrate, anhydrous, spray-dried with other substances and the like), the duration of the exchange, the sodium content of the silicate and, in particular, the crystal structure. A pH of 9.5-11.5 is preferred.

An optimum duration of exchange in general exists, since slow hydrolysis of the silicate takes place in aqueous solution. The silicate and the water to be softened are preferably brought into contact for 5 to 240 minutes, in particular 10–60 minutes. The amount of sodium silicate must be at least equivalent to the hardness constituents for complete softening (in the absence of other softeners). The water to be softened contains of the order of 10–200 mg of MgO/l and 50–500 mg of CaO/l, in particular 20–100 mg of MgO/l and 60–350 mg of CaO/l. A high sodium content of the crystalline sodium silicate in general also denotes a high specific exchange capacity.

In principle, the value of the calcium- or magnesium-binding capacity, based on the amount weighed out, is increased by high starting concentrations of calcium and magnesium ions. In comparative investigations on water softening, it is therefore important to pay attention to what starting hardness has been chosen. The desired residual hardness is furthermore decisive; associated therewith is the required amount of crystalline layered sodium silicate which must be added. It has been found that an overproportional amount of water softener must be added to reduce a small residual hardness.

If 500 mg of crystalline $Na_2Si_2O_5$ with characteristic X-ray diffraction reflections at $(3.97\pm0.08)\times10^{-8}$ cm and $(2.43+0.5)\times10^{-8}$ cm (of lesser intensity) (Na-SKS-6) are added to 1 l of aqueous solution containing about 300 mg of CaO and with a pH of 10, a Ca-binding capacity of about 150 to almost 200 mg of CaO/g of crystalline $Na_2Si_2O_5$ is determined at room temperature by the determination method described. If about 500 mg of crystalline $Na_2Si_2O_5$ are added to 1 l of a solution containing about 200 mg of MgO and with a pH of 10, a reduction in the dissolved $Mg^{2+}$ ions corresponding to an Mg-binding capacity of about 160–170 mg of MgO/g of $Na_2Si_2O_5$ can be achieved.

The invention is illustrated in more detail by the following Examples.

EXAMPLES

The X-ray diffraction diagrams shown in Tables 11 to 16 show the crystalline sodium silicates having the composition $Na_2Si_2O_5$ investigated. Samples 1 to 4 were prepared by crystallization of X-ray amorphous sodium silicate with a modulus (molar ratio $SiO_2/Na_2O$) of 2.0 at 550° to 800° C. The zeolite A (sodium form) investigated for comparison has a water content of 17.1%; its X-ray diffraction diagram is shown in Table 13.

The calcium- or magnesium-binding capacity was determined by a procedure in which a certain amount of the crystalline silicated was added to a $CaCl_2$ solution or $MgCl_2$ solution which had been brought to pH 10 with dilute sodium hydroxide solution and in which the content had been determined by titration with EDTA solution. The reaction mixture was in general stirred for 15 minutes and then filtered over a blue-band filter. The content of calcium or magnesium ions in the filtrate was determined by titration with EDTA. In this determination method, soluble complexes of the water softener with the magnesium and the calcium ions are not differentiated from these ions. The actual softening of the water is therefore greater than that found by this method and shown in the Tables. The experimental results are shown in Tables 8 and 9.

These results show that the crystalline sodium silicates having the composition $Na_2Si_2O_5$ investigated give about an equally good result for the calcium-binding capacity as zeolite A, and in some cases are even superior to this substance. A clear superiority over zeolite A is found in the magnesium-binding capacity.

The results obtained in the determination of the calcium-binding capacity of a combination of the water softener employed according to the invention and other water softeners are shown in Table 10. Comparison of Example 22 with 21 and Example 24 with 23 shows in each case that the total water softening action is clearly increased by adding crystalline $Na_2Si_2O_5$.

It was furthermore investigated whether crystalline sodium silicates still show a binding capacity for calcium even after exposure to severe hydrolysis conditions. In Example 25, 200 ml of sample 2 were boiled up in 10 ml of deionized water. The substance thereby dissolved to give a slightly cloudy solution. After cooling, this was added to 200 ml of a calcium solution corresponding to Example 8. A calcium-binding capacity of 111 mg of CaO/g of sample 2 was found.

A crystalline hydrolysis product of sample 2 having a composition of about $NaHSi_2O_5 \cdot yH_2O$ was obtained when sample 2 was suspended in water, the suspension was filtered and the solid was dried. The X-ray diffraction diagram of the product dried at 105° C. is shown in Table 16. Under the conditions of Example 8, the substance has a calcium-binding capacity of 124 mg of CaO/g.

An X-ray amorphous sodium silicate with the same composition as samples 1 to 4 is obtained if waterglass solution with a molar ratio of $SiO_2/Na_2O$ of about 2.06:1 is heated at 500° C. for 2 hours. Values of 0 to 40 mg of CaO/g of amorphous silicate were obtained on analogous determination of the calcium-binding capacity (cf. Example 26).

TABLE 1

| Na-SKS-5 | |
|---|---|
| $d(10^{-8}$ cm) | relative intensity |
| 4.92 (±0.10) | m–i |
| 3.95 (±0.08) | w |
| 3.85 (±0.08) | m–i |
| 3.77 (±0.08) | i–vi |
| 3.29 (±0.07) | vi |
| 3.20 (±0.06) | w |
| 2.64 (±0.05) | w–m |
| 2.53 (±0.05) | w |
| 2.45 (±0.05) | m–i |
| 2.41 (±0.05) | w |
| 2.38 (±0.05) | w |

TABLE 2

| Na-SKS-6 | |
|---|---|
| $d(10^{-8}$ cm) | relative intensity |
| 4.92 (±0.10) | w |
| 3.97 (±0.08) | vi |
| 3.79 (±0.08) | m–i |
| 3.31 (±0.07) | w |
| 3.02 (±0.06) | w–m |
| 2.85 (±0.06) | w |
| 2.65 (±0.05) | w |
| 2.49 (±0.05) | w |
| 2.43 (±0.05) | m |

TABLE 3

| Na-SKS-7 | |
|---|---|
| $d(10^{-8}$ cm) | relative intensity |
| 7.96 (±0.16) | w |
| 6.00 (±0.12) | i–vi |

TABLE 3-continued

Na-SKS-7

| d(10⁻⁸ cm) | relative intensity |
|---|---|
| 5.48 (±0.11) | w |
| 4.92 (±0.11) | w |
| 4.30 (±0.09) | m |
| 4.15 (±0.08) | i |
| 3.96 (±0.08) | i-vi |
| 3.78 (±0.08) | m-i |
| 3.63 (±0.07) | vi |
| 3.31 (±0.07) | w |
| 3.12 (±0.06) | w-m |
| 3.08 (±0.06) | w-m |
| 3.06 (±0.06) | m-i |
| 2.97 (±0.06) | i-vi |
| 2.85 (±0.06) | w |
| 2.70 (±0.05) | w-m |
| 2.66 (±0.05) | m-i |
| 2.63 (±0.05) | w |
| 2.59 (±0.06) | w-m |
| 2.54 (±0.05) | w-m |
| 2.43 (±0.05) | vi |

TABLE 4

Na-SKS-11

| d(10⁻⁸ cm) | relative intensity |
|---|---|
| 6.08 (±0.12) | w |
| 5.88 (±0.12) | w-m |
| 4.22 (±0.08) | vi |
| 3.26 (±0.07) | w-m |
| 3.03 (±0.06) | w-m |
| 2.94 (±0.06) | m |
| 2.89 (±0.06) | w |
| 2.64 (±0.05) | w-m |
| 2.56 (±0.05) | w-m |
| 2.49 (±0.05) | w |
| 2.43 (±0.05) | w |

TABLE 5

Na-SKS-9

| d(10⁻⁸ cm) | relative intensity |
|---|---|
| 7.79 (±0.16) | m-vi |
| 4.68 (±0.09) | m-vi |
| 4.06 (±0.08) | w-m |
| 3.94 (±0.08) | w-m |
| 3.86 (±0.08) | w-m |
| 3.62 (±0.07) | vi |
| 3.55 (±0.07) | i-vi |
| 3.53 (±0.07) | i-vi |
| 3.26 (±0.07) | w-m |
| 3.18 (±0.06) | w-m |
| 2.72 (±0.05) | w-m |
| 2.46 (±0.05) | w-m |

TABLE 6

Na-SKS-10

| d(10⁻⁸ cm) | relative intensity |
|---|---|
| 10.3 (±0.21) | m-vi |
| 5.17 (±0.10) | w-m |
| 4.02 (±0.08) | vi |
| 3.65 (±0.07) | m-i |
| 3.45 (±0.07) | m-vi |
| 3.17 (±0.06) | m-vi |
| 3.11 (±0.06) | w-i |
| 2.48 (±0.05) | m-vi |
| 2.33 (±0.05) | w-m |
| 2.01 (±0.04) | w-m |

TABLE 7

Na-SKS-13

| d(10⁻⁸ cm) | relative intensity |
|---|---|
| 6.37 (±0.13) | m-i |
| 4.04 (±0.08) | m-i |
| 3.87 (±0.08) | vi |
| 3.58 (±0.07) | m-i |
| 3.20 (±0.06) | w-m |
| 3.04 (±0.06) | w-m |
| 2.67 (±0.05) | w-m |
| 2.45 (±0.05) | w-m |
| 2.31 (±0.05) | w-m |

Na-SKS-5 can be prepared in accordance with Glastechn. Ber. 37, 194–200 (1964). The X-ray spectrum has the numbers 18-1241 and 22-1397. The product has the approximate composition $Na_2Si_2O_5$. In the X-ray diffraction diagram, it resembles $\alpha$-$Na_2Si_2O_5$. Sample 4 corresponds to Na-SKS-5 with a small amount of Na-SKS-6 impurity.

Na-SKS-6 can be prepared in accordance with Zeitschrift für Kristallogr. 129, 396–404 (1969). It has the approximate composition $Na_2Si_2O_5$ and resembles $\delta$-$Na_2Si_2O_5$. Samples 1 and 2 correspond to Na-SKS-6.

Na-SKS-7 can be prepared in accordance with Glastechn. Ber. 37, 194–200 (1964). It resembles $\beta$-$Na_2Si_2O_5$. Sample 3 corresponds to Na-SKS-7.

Na-SKS-11 can be prepared in accordance with Glastech. Ber. 37, 194–200 (1964), and in accordance with Zeitschrift für Kristallogr. 129, 396–404 (1969). It resembles $\gamma$-$Na_2Si_2O_5$.

Na-SKS-9 can be prepared in accordance with Bull. Soc. franc. Min. Crist., 95, 371–382 (1972). It has the approximate composition $NaHSi_2O_5 \cdot H_2O$. The X-ray spectrum has the number 27-709. The hydrolysis product of sample 2 corresponds to Na-SKS-9.

Na-SKS-10 can be prepared in accordance with Bull. Soc. franc. Min. Crist., 95, 371–382 (1972) and in accordance with Amer. Mineral., 62, 763–771 (1977). The X-ray spectrum has the number 25-1309. The product has the approximate composition $NaHSi_2O_5 \cdot 2H_2O$. It resembles the mineral canemite.

Na-SKS-13 can be prepared in accordance with Bull. Soc. franc. Min. Crist., 95, 371–382 (1972). The X-ray spectrum has the number 27-708. The product has the approximate composition $NaHSi_2O_5$.

TABLE 8

Experimental results on water softening (Ca-binding capacity) by crystalline $Na_2Si_2O_5$

| Example No. | Sample | Amount weighed out (mg) (anhydrous) | concentration of the starting solution (mg of CaO/L) | Amount of starting solution (ml) | Temperature (°C.) | Duration (minutes) | Concentration of the solution after filtration (mg of CaO/L) | Ca-binding capacity (mg of CaO/g $Na_2Si_2O_5$) |
|---|---|---|---|---|---|---|---|---|
| 1* | Zeolite A | 396 | 294 | 500 | 22–26 | 15 | 162 | 167 |
| 2* | Zeolite A | 462 | 289 | 985 | 90 | 15 | 213 | 163 |
| 3* | Zeolite A | 200 | 294 | 200 | 22–26 | 15 | 133 | 161 |
| *4 | Zeolite A | 413 | 98** | 1000 | 22–26 | 15 | 52 | 111 |
| 5 | 1 | 533 | 316 | 1000 | 22–26 | 15 | 216 | 187 |
| 6 | 1 | 235 | 98** | 1000 | 22–26 | 15 | 77 | 86 |

TABLE 8-continued

Experimental results on water softening (Ca-binding capacity) by crystalline $Na_2Si_2O_5$

| Example No. | Sample | Amount weighed out (mg) (anhydrous) | concentration of the starting solution (mg of CaO/L) | Amount of starting solution (ml) | Temperature (°C.) | Duration (minutes) | Concentration of the solution after filtration (mg of CaO/L) | Ca-binding capacity (mg of CaO/g $Na_2Si_2O_5$) |
|---|---|---|---|---|---|---|---|---|
| 7 | 1 | 489 | 292 | 1000 | 90 | 15 | 211 | 164 |
| 8 | 2 | 200 | 294 | 200 | 22–26 | 15 | 128 | 166 |
| 9 | 2 | 533 | 316 | 1000 | 22–26 | 15 | 221 | 178 |
| 10 | 3 | 520 | 306 | 1000 | 22–26 | 15 | 221 | 164 |
| 11 | 3 | 512 | 306 | 1000 | 22–26 | 18 hours | 233 | 142 |
| 12 | 3 | 462 | 306 | 1000 | 90 | 15 | 212 | 205 |
| 13 | 3 | 997 | 316 | 500 | 22–26 | 25 | 27 | 131 |
| 14 | 4 | 351 | 292 | 1000 | 22–26 | 15 | 259 | 94 |

*Comparison examples
**Starting solution additionally contains 2 g of $Na^+$/L
Samples 1 and 2 correspond to Na-SKS-6 (two different batches),
Sample 3 corresponds to Na-SKS-7, Sample 4 corresponds to Na-SKS-5

TABLE 9

Experimental results on water softening (Mg-binding capacity) by crystalline $Na_2Si_2O_5$

| Example No. | Sample | Amount weighed out (mg) (anhydrous) | Concentration of the starting solution (mg of MgO/l) | Amount of starting solution (ml) | Temperature (°C.) | Duration (minutes) | Concentration of the solution after filtration (mg of MgO/l) | Mg-binding capacity (mg of MgO/g $Na_2Si_2O_5$) |
|---|---|---|---|---|---|---|---|---|
| 15* | Zeolite A | 413 | 198 | 1000 | 22–26 | 15 | 186 | 29 |
| 16* | Zeolite A | 445 | 72 | 1000 | 22–26 | 15 | 71 | 2 |
| 17* | Zeolite A | 200 | 72 | 200 | 22–26 | 15 | 72 | 0 |
| 18 | 1 | 545 | 198 | 1000 | 22–26 | 15 | 105 | 171 |
| 19 | 3 | 536 | 198 | 1000 | 22–26 | 15 | 108 | 167 |
| 20 | 3 | 200 | 72 | 200 | 22–26 | 15 | 10 | 61 |

*Comparison examples

TABLE 10

Experimental results on water softening (Ca-binding capacity) by crystalline sodium silicate with other water softeners

| Example No. | Sample | Amount weighed out (mg) (anhydrous) | Concentration of the starting solution (mg of CaO/l) | Amount of starting solution (ml) | Temperature (°C.) | Duration (minutes) | Concentration of the solution after filtration (mg of CaO/l) |
|---|---|---|---|---|---|---|---|
| 21* | Zeolite A | 100 | 294 | 200 | 22–26 | 15 | 196 |
| 22 | Zeolite A 2 | 100 100 | 294 | 200 | 22–26 | 15 | 135 |
| 23* | NTPP* | 100 | 294 | 200 | 22–26 | 15 | 125 |
| 24 | NTPP* 2 | 100 100 | 294 | 200 | 22–26 | 15 | 20 |
| 25 | 2 hydrolyzed | 200 | 280 | 210 | 22–26 | 15 | 173 |
| 26* | Na silicate, amorphous (page 11) | 200 | 287 | 200 | 22–26 | 15 | 276 |

*Comparison examples
**Pentasodiumtriphosphate (calculated as anhydrous)

TABLE 11

| 2THETA | Sample 1 d ($10^{-8}$ cm) | I/$I_o$ |
|---|---|---|
| 4.30 | 20.5 | 3 |
| 12.80 | 6.91 | 3 |
| 14.60 | 6.06 | 18 |
| 18.00 | 4.92 | 14 |
| 19.70 | 4.50 | 1 |
| 20.70 | 4.29 | 3 |
| 21.10 | 4.21 | 13 |
| 21.40 | 4.15 | 6 |
| 21.80 | 4.07 | 8 |
| 22.40 | 3.97 | 100 |
| 23.00 | 3.86 | 9 |
| 23.45 | 3.79 | 52 |
| 24.45 | 3.64 | 15 |
| 25.80 | 3.45 | 9 |
| 26.95 | 3.31 | 10 |
| 27.80 | 3.21 | 2 |
| 28.75 | 3.10 | 8 |
| 29.15 | 3.06 | 4 |
| 29.55 | 3.02 | 24 |

TABLE 11-continued

| 2THETA | Sample 1 d ($10^{-8}$ cm) | I/$I_o$ |
|---|---|---|
| 30.05 | 2.97 | 5 |
| 30.75 | 2.91 | 10 |
| 31.45 | 2.84 | 17 |
| 32.85 | 2.72 | 5 |
| 33.30 | 2.69 | 1 |
| 33.75 | 2.65 | 4 |
| 34.70 | 2.58 | 2 |
| 34.95 | 2.57 | 7 |
| 35.35 | 2.54 | 9 |
| 36.00 | 2.49 | 11 |
| 36.60 | 2.45 | 6 |
| 37.00 | 2.43 | 40 |
| 37.95 | 2.37 | 2 |
| 39.15 | 2.30 | 4 |

TABLE 12

| | Sample 2 | |
|---|---|---|
| 2THETA | d ($10^{-8}$ cm) | $I/I_o$ |
| 12.80 | 6.91 | 3 |
| 14.60 | 6.06 | 9 |
| 18.00 | 4.92 | 12 |
| 21.10 | 4.21 | 13 |
| 21.70 | 4.09 | 4 |
| 22.40 | 3.97 | 100 |
| 23.00 | 3.86 | 6 |
| 23.45 | 3.79 | 38 |
| 24.40 | 3.64 | 8 |
| 25.80 | 3.45 | 8 |
| 26.90 | 3.31 | 9 |
| 27.70 | 3.22 | 2 |
| 28.70 | 3.11 | 5 |
| 29.50 | 3.03 | 15 |
| 30.70 | 2.91 | 8 |
| 31.40 | 2.85 | 11 |
| 32.80 | 2.73 | 5 |
| 33.80 | 2.65 | 2 |
| 34.90 | 2.57 | 5 |
| 35.30 | 2.54 | 5 |
| 35.95 | 2.50 | 10 |
| 36.50 | 2.46 | 4 |
| 37.00 | 2.43 | 36 |
| 37.95 | 2.37 | 3 |
| 39.20 | 2.30 | 3 |

TABLE 13

| | Sample 3 | |
|---|---|---|
| 2THETA | d ($10^{-8}$ cm) | $I/I_o$ |
| 4.40 | 20.1 | 7 |
| 11.40 | 7.96 | 6 |
| 14.75 | 6.00 | 66 |
| 16.15 | 5.48 | 8 |
| 18.00 | 4.92 | 10 |
| 20.65 | 4.30 | 34 |
| 21.40 | 4.15 | 63 |
| 22.40 | 3.97 | 90 |
| 22.45 | 3.96 | 100 |
| 23.00 | 3.86 | 5 |
| 23.50 | 3.78 | 45 |
| 24.48 | 3.63 | 90 |
| 25.80 | 3.45 | 5 |
| 26.90 | 3.31 | 8 |
| 27.70 | 3.22 | 3 |
| 28.63 | 2.12 | 22 |
| 28.95 | 3.08 | 23 |
| 29.20 | 3.06 | 43 |
| 29.50 | 3.03 | 19 |
| 30.03 | 2.97 | 73 |
| 30.70 | 2.91 | 8 |
| 31.40 | 2.85 | 14 |
| 32.80 | 2.73 | 5 |
| 33.20 | 2.70 | 23 |
| 33.60 | 2.66 | 47 |
| 34.00 | 2.63 | 8 |
| 34.55 | 2.59 | 34 |
| 35.00 | 2.56 | 5 |
| 35.35 | 2.54 | 19 |
| 35.95 | 2.50 | 7 |
| 36.90 | 2.43 | 100 |
| 38.55 | 2.33 | 6 |
| 39.60 | 2.27 | 7 |

TABLE 14

| | Sample 4 | |
|---|---|---|
| 2THETA | d ($10^{-8}$ cm) | $I/I_o$ |
| 9.20 | 9.60 | 3 |
| 12.80 | 6.91 | 1 |
| 14.60 | 6.06 | 4 |
| 17.95 | 4.94 | 32 |
| 21.15 | 4.20 | 4 |
| 22.40 | 3.97 | 30 |
| 23.00 | 3.86 | 91 |
| 23.50 | 3.78 | 71 |

TABLE 14-continued

| | Sample 4 | |
|---|---|---|
| 2THETA | d ($10^{-8}$ cm) | $I/I_o$ |
| 24.45 | 3.64 | 4 |
| 25.55 | 3.48 | 4 |
| 25.80 | 3.45 | 3 |
| 26.92 | 3.31 | 100 |
| 27.70 | 3.22 | 15 |
| 28.65 | 3.11 | 5 |
| 29.50 | 3.03 | 7 |
| 30.10 | 2.97 | 1 |
| 30.75 | 2.91 | 3 |
| 31.45 | 2.84 | 4 |
| 32.65 | 2.74 | 4 |
| 33.80 | 2.65 | 19 |
| 35.30 | 2.54 | 14 |
| 35.95 | 2.50 | 3 |
| 36.10 | 2.49 | 3 |
| 36.60 | 2.45 | 32 |
| 37.05 | 2.42 | 20 |
| 37.60 | 2.39 | 17 |

TABLE 15

| | Zeolite A | |
|---|---|---|
| 2THETA | d ($10^{-8}$ cm) | $I/I_o$ |
| 7.10 | 12.4 | 63 |
| 10.10 | 8.75 | 47 |
| 12.40 | 7.13 | 50 |
| 16.05 | 5.52 | 40 |
| 17.60 | 5.03 | 3 |
| 20.35 | 4.36 | 11 |
| 21.30 | 4.17 | 7 |
| 21.60 | 4.11 | 58 |
| 22.75 | 3.91 | 7 |
| 23.90 | 3.72 | 90 |
| 25.00 | 3.56 | 1 |
| 26.05 | 3.42 | 27 |
| 27.05 | 3.29 | 79 |
| 28.95 | 3.08 | 4 |
| 29.90 | 2.99 | 100 |
| 30.75 | 2.91 | 16 |
| 32.50 | 2.75 | 23 |
| 33.30 | 2.69 | 7 |
| 34.10 | 2.63 | 61 |
| 35.70 | 2.51 | 11 |
| 36.45 | 2.46 | 9 |
| 37.95 | 2.37 | 6 |
| 40.05 | 2.25 | 6 |

TABLE 16

| | Hydrolysis product of Sample 2 | |
|---|---|---|
| 2THETA | d ($10^{-8}$ cm) | $I/I_o$ |
| 11.35 | 7.79 | 55 |
| 16.60 | 5.34 | 3 |
| 16.90 | 5.24 | 4 |
| 18.95 | 4.68 | 43 |
| 19.90 | 4.46 | 6 |
| 20.50 | 4.33 | 9 |
| 21.90 | 4.06 | 17 |
| 22.55 | 3.94 | 17 |
| 23.00 | 3.86 | 17 |
| 24.60 | 3.62 | 100 |
| 25.05 | 3.55 | 82 |
| 25.20 | 3.53 | 82 |
| 27.30 | 3.26 | 28 |
| 28.00 | 3.18 | 16 |
| 23.90 | 2.72 | 25 |
| 36.55 | 2.46 | 24 |

I claim:

1. In a washing and cleaning composition containing effective amounts of surfactant and builder the improvement wherein said builder comprises a crystalline layered sodium silicate having the composition NaM-Si$_x$O$_{2x+1}$·yH$_2$O, in which M denotes sodium or hydrogen, x is a number from 1.9 to 4 and y is a number from 0 to 20.

2. Composition as claimed in claim 1 containing in addition a water softener selected from the group consisting of pentasodium triphosphate, trisodiumnitrilotrisulfonate, Zeolite A, phosphonates, polycarboxylates, amorphous silicates and other crystalline silicates.

3. Composition as claimed in claim 1 wherein the crystalline layered sodium silicate employed has an x-ray diffraction diagram which is published in the Joint Committee on Powder Diffraction Standard under one of the following numbers: 18-241, 22-1397, 22-1397 A, 19-1233, 19-1234, 19-1237, 23-529, 24-1123, 24-1123 A, 29-1261, 18-1242, 22-1395, 19-1235, 22-1396, 19-1236, 18-1240, 19-1232, 18-1239, 12-102, 23-703, 25-1309, 27-708 and 27-709.

4. Composition as claimed in claim 1 wherein said crystalline sodium silicate has an x-ray diffraction reflection pattern which is shown in one of the Tables 1 through 7 of the specification.

5. A washing and cleaning composition comprising a surfactant and a detergent builder, wherein at least one of the builders therefor, is a crystalline layered sodium silicate having the composition $NaMSi_xO_{2x+1} \cdot yH_2O$, in which M denotes sodium or hydrogen, x is a number from 1.9 to 4, and y is a number from 0 to 20.

* * * * *